(12) United States Patent
Bodine et al.

(10) Patent No.: US 8,190,650 B2
(45) Date of Patent: May 29, 2012

(54) EFFICIENTLY FILTERING USING A WEB SITE

(75) Inventors: Jacqueline F. Bodine, New York, NY (US); Michael J. Morton, Seattle, WA (US); Steven J. Rayson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 797 days.

(21) Appl. No.: 11/416,059

(22) Filed: May 2, 2006

(65) Prior Publication Data

US 2007/0260585 A1    Nov. 8, 2007

(51) Int. Cl.
*G06F 7/00* (2006.01)
(52) U.S. Cl. ...................................... 707/802
(58) Field of Classification Search .............. 707/7, 802
See application file for complete search history.

(56) References Cited

U.S. PATENT DOCUMENTS

| | | | |
|---|---|---|---|
| 5,455,945 A | 10/1995 | VanderDrift | |
| 5,819,269 A | 10/1998 | Uomini | |
| 6,018,750 A | 1/2000 | Connell et al. | |
| 6,073,170 A | 6/2000 | Sumita et al. | |
| 6,532,590 B1 | 3/2003 | Chimoto | |
| 6,751,614 B1 | 6/2004 | Rao | |
| 7,231,596 B2 * | 6/2007 | Koren | 715/210 |
| 7,233,951 B1 * | 6/2007 | Gainer et al. | 1/1 |
| 2002/0049704 A1 | 4/2002 | Vanderveldt et al. | |
| 2002/0184111 A1 | 12/2002 | Swanson | |
| 2003/0009495 A1 | 1/2003 | Adjaoute | |
| 2003/0056030 A1 * | 3/2003 | Gao et al. | 709/330 |
| 2004/0100485 A1 | 5/2004 | Allport | |
| 2004/0163039 A1 * | 8/2004 | Gorman | 715/505 |
| 2004/0267770 A1 | 12/2004 | Lee | |
| 2005/0044060 A1 | 2/2005 | Wu et al. | |
| 2005/0114704 A1 * | 5/2005 | Swander | 713/201 |
| 2005/0182753 A1 | 8/2005 | Warner et al. | |
| 2005/0222892 A1 * | 10/2005 | Sutherland et al. | 705/10 |
| 2005/0246331 A1 | 11/2005 | De Vorchik et al. | |
| 2006/0041734 A1 * | 2/2006 | Lim et al. | 711/206 |
| 2006/0041834 A1 * | 2/2006 | Chen et al. | 715/509 |
| 2006/0161443 A1 * | 7/2006 | Rollins | 705/1 |
| 2006/0224568 A1 * | 10/2006 | Debrito | 707/3 |
| 2007/0073635 A1 * | 3/2007 | Vignet | 707/1 |
| 2007/0244765 A1 * | 10/2007 | Hunter et al. | 705/26 |
| 2009/0230303 A1 * | 9/2009 | Teshima et al. | 250/310 |

FOREIGN PATENT DOCUMENTS

EP    1388783 A1    2/2004
WO    2005119435 A2    12/2005

OTHER PUBLICATIONS

International Search Report PCT/US2007/010693, dated Nov. 9, 2007, pp. 1-7.
Anagnostopoulous, et al., "Automatic Web site classification in a large repository under information filtering and retrieval techniques" Electrotechnical Conference, 2002. Milecon 2002, May 9, 2002. pp. 279-283.

(Continued)

*Primary Examiner* — Angela Lie

(57) ABSTRACT

A technology for efficiently filtering using a web site is disclosed. In one method approach, distinct filtering values based on a type of data selected from a web page associated with a web site are received without requiring retrieval of filtering values that are unrelated to the selected type of data. The distinct filtering values are displayed without requiring the web page to be entirely updated.

16 Claims, 12 Drawing Sheets

OTHER PUBLICATIONS

Greg Nudelman, "Improve the usability of search-results pages", http://www.javaworld.com/javaworld/jw-01-2006/jw-0123-usability.html.

Mark Molander, "Reducing the user interface", http://www-128.ibm.com/developerworks/web/library/us-reduce/index.html.

Shneiderman, et al., "A User-Interface Framework for Text Searches", http://www.dlib.org/dlib/january97/retrieval/01shneiderman.html.

European Search Report for 07776659.0, Mailed Sep. 17, 2009, 9 pages.

Sriam, V., "Excel Like AutoFilter for Datagrid", Internet, [Online] May 5, 2004, pp. 1-4, Microsoft ASP.NET, Retrieved from Internet: URL: http://www.dotnetforce.com/Content.aspx?t+a&n=2010> on Sep. 7, 2009.

Gehtland, J., et al., "Ajax Frameworks", Pragmatic Ajax, Mar. 2006, pp. 79-94.

International Preliminary Report on Patentability and Written Opinion for PCT application No. PCT/US2007/013109, Issued Jan. 6, 2009, 5 pages.

* cited by examiner

| Due Date | View: All Tasks | |
|---|---|---|
| | | % Complete |
| A→Z | Smallest on Top | |
| Z→A | Largest on Top | |
| 2/1 ● | Clear Filter from % Complete | |
| 2/2 ✓ | (Empty) | |
| | 15% | |
| | 20% ——— 810 | |

EFFICIENTLY FILTERING USING A WEB SITE

BACKGROUND

As computer technology has advanced to enable people to store more types and larger quantities of data on computer systems, there has been a growing need to enable people to find particular pieces of data that they had previously stored. For example, people frequently need to find old e-mails in their e-mail systems. Typically, people will perform a sort on values, such as the sender's name or something that would be in the e-mail's subject line. Examples of data that people store and want to find include documents, e-mails, and calendars, among other things.

Collaboration types of software have also become available that enable people to organize many types of data, for example, as a part of accomplishing some type of project. For example, collaboration software can be used to list the people working on a project as well as organizing documents, e-mails, a calendar of tasks completed and tasks that need to be completed for the project.

At various times, the people working on the project as well as their managers may want to find pertinent data. In order to find a desired document, for example, people typically perform a sort operation or a filter operation on documents that are associated with a project in the collaboration software.

However, as will become more evident, conventional sort and filter operations tend to be slow which discourages people from using them. For example, typically it takes approximately 30 seconds for a large amount of data to be filtered or sorted.

SUMMARY

This Summary is provided to introduce concepts concerning efficiently filtering values which are further described below in the Detailed Description. This Summary is not intended to identify key features or essential features of the claimed subject matter, nor is it intended to be used as an aid in determining the scope of the claimed subject matter.

A technology for efficiently filtering using a web site is disclosed. In one method approach, distinct filtering values based on a type of data selected from a web page associated with a web site are received without requiring retrieval of filtering values that are unrelated to the selected type of data. The distinct filtering values are displayed without requiring the web page to be entirely updated.

DESCRIPTION OF THE DRAWINGS

The accompanying drawings, which are incorporated in and form a part of this specification, illustrate embodiments of the technology for efficiently filtering using a web site and, together with the description, serve to explain principles discussed below:

FIG. 8 depicts a web page with a distinct filtering value that has been selected, according to one embodiment of the present technology.

Figure 1:
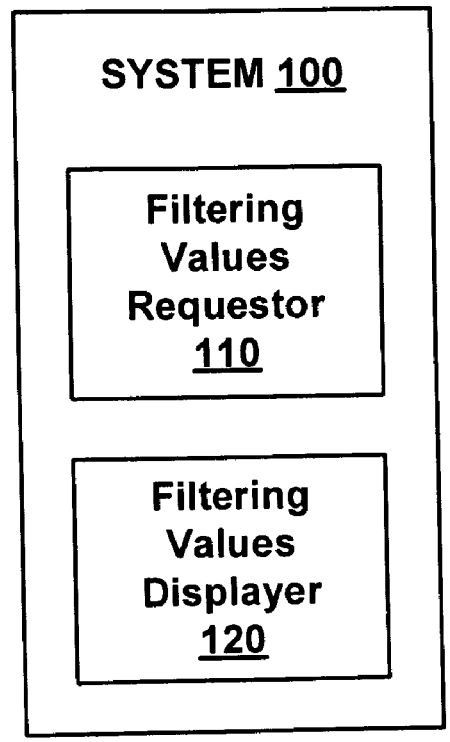
FIG. 1 depicts a block diagram of a system for efficiently filtering values, according to one embodiment of the present technology.

The drawings referred to in this description should be understood as not being drawn to scale except if specifically noted.

DETAILED DESCRIPTION

Reference will now be made in detail to embodiments of the present technology for efficiently filtering using a web site, examples of which are illustrated in the accompanying drawings. While the technology for efficiently filtering using a web site will be described in conjunction with various embodiments, it will be understood that they are not intended to limit the present technology for efficiently filtering using a web site to these embodiments. On the contrary, the presented technology for efficiently filtering using a web site is intended to cover alternatives, modifications and equivalents, which may be included within the spirit and scope the various embodiments as defined by the appended claims. Furthermore, in the following detailed description, numerous specific details are set forth in order to provide a thorough understanding of the present technology for efficiently filtering using a web site. However, the present technology for efficiently filtering using a web site may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present detailed description, discussions utilizing terms such as "filtering", "providing", "receiving", "sorting", "determining", "displaying", "storing", "obtaining", "dividing", or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present technology for efficiently filtering using a web site is also well suited to the use of other computer systems such as, for example, optical and mechanical computers. Additionally, it should be understood that in embodiments of the present technology for efficiently filtering using a web site, one or more of the steps can be performed manually.

Overview of Efficiently Filtering Using a Web Site

With conventional filtering systems, when a user is interested in sorting or filtering data, the user can interact with their client to cause a web page with the data to be displayed on their client. The client will request the data from a web server and the web server will return the data to the client. The data can be displayed on the web page in the form of columns and rows where the columns describe the types of data that are in the fields for each row. A row shall also be referred to as an item. According to one embodiment, the data includes all of the values associated with the rows and the columns.

Each value associated with the data can be displayed in a field. For example, a value for a particular row under a particular column is displayed in a field. When the user requests that a filtering operation be performed, the client requests all of the data from the web server again. The web server performs the filtering operation on all of the data, which involves recalculating all of the values that would be displayed for all of the fields on the web page. The client will re-update the entire web page as a part of displaying the results from filtering the data.

However, according to one embodiment of the present technology, an efficient method of filtering using a web site is provided. For example, as already stated, a column can represent a type of data. A user can request that distinct filtering values for a type of data be displayed. The distinct filtering values are displayed, according to one embodiment, without re-updating the entire web page. Since, for example, the distinct filtering values are for a subset of the data, the web server, according to one embodiment, does not have to recalculate all of the values for all of the fields for a web page as a conventional web server has to do. Since, for example, the distinct filtering values can be displayed without re-updating the entire web page, the client, according to one embodiment is more efficient than a conventional client. These are just two examples of ways various embodiments provide for efficiently filtering.

A System for Efficiently Filtering Using a Web Site

FIG. 1 depicts a block diagram of a system for efficiently filtering using a web site, according to one embodiment of the present technology. The system 100 includes a filtering values requestor 110 and a filtering values displayer 120. The filtering values requestor 110 can request distinct filtering values, for example, for a type of data. The filtering values displayer 120 can display the distinct filtering values, for example, without re-updating the entire web page, as will become more evident.

Figure 2:
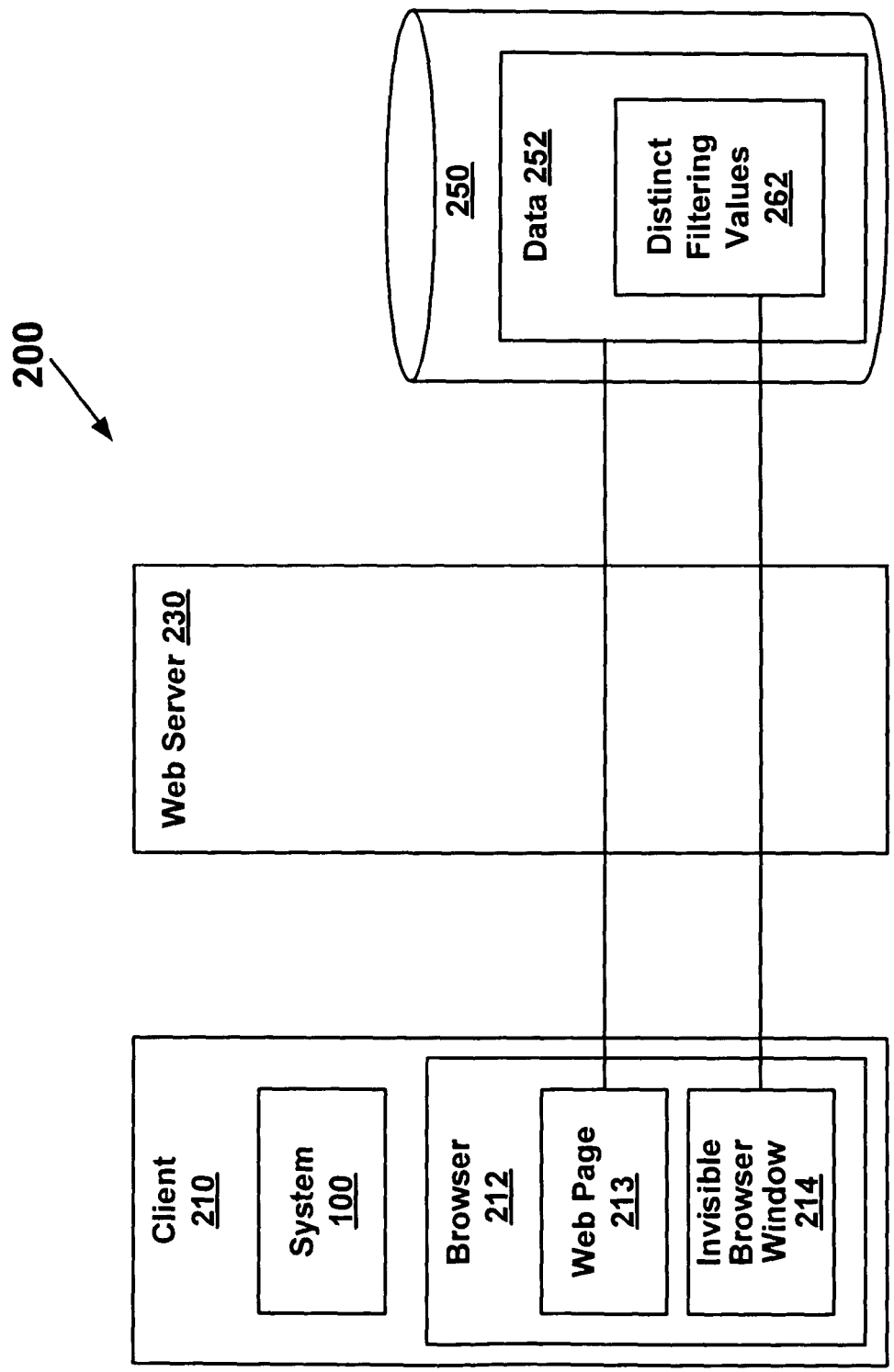
FIG. 2 depicts a block diagram of a networked system in which a system for efficiently filtering using a web site operates, according to one embodiment of the present technology.

FIG. 2 depicts a block diagram of a networked system in which a system 100 for efficiently filtering using a web site operates, according to one embodiment of the present technology. For example, the networked system 200 includes a client 210, a web server 230, and storage 250. The client 210 and the web server 230, according to one embodiment, can communicate over a network.

The client 210 includes a system 100 for efficiently filtering using a web page 213 and a browser 212. The browser 212 includes the web page 213 and an invisible browser window 214. The web page 213 can be downloaded from a web site and displayed on the client 210 by the browser 212. Many different kinds of browsers, such as Internet Explorer™, Firefox™, and Netscape™ can be used. The memory 250 includes data 252. The data 252, according to one embodiment, includes distinct filtering values 262.

As already stated, according to one embodiment of the present technology, an efficient method of filtering using a web site is provided. For example, assume that a user is only interested in filtering on a type of data from the data 252 stored on memory 250. Assume for the purposes of illustration, that the web page 213 displays rows that represent people, such as Jackie, Cheryl, and John. Further, assume that the web page 213 also displays that Jackie is a 40 year old inventor that lives in Washington, Cheryl is a 41 old patent agent that lives in California and John is a 42 year old patent attorney that lives in Nevada. In this case, data 252 would include all of the values Jackie, Cheryl, John, 40, 41, 42, California, Washington and Nevada, according to one embodiment.

The column headers of web page 213 describe the types of the data 252, according to one embodiment. Examples of column headers are "Role," "Age," and "State." Values from the data 252 can be displayed in fields under each of the columns. Continuing the example, the fields under the "Role" column would be "inventor," "patent agent," and "patent attorney." In this case, the distinct filtering values 262 for the "Role" column are "inventor," "patent agent," and "patent attorney." The header of the column may have text that says "Role." If the user is interested in filtering on a particular type of role, for example, the user can interact with the header of the column to cause distinct filtering values 262 for that column to be displayed.

For example, the client 210 can request that the web server 230 return all of the distinct filtering values 262 for the "Role." The web server 230 returns the distinct filtering values 262 associated with "Role." The client 210 can use an invisible browser window 214 to store the distinct filtering values 262, e.g., "inventor," "patent agent," and "patent attorney." The distinct filtering values 262 can be displayed on the client 210 without re-updating the entire web page 213, according to one embodiment. For example, the distinct filtering values 262 that are in the invisible browser window 214 can be put into a drop down menu and displayed on the client 210.

Assume for the sake of illustration that the user is interested in finding the subset of the data 252 that pertains to inventors. In this case, the user can click on the distinct filtering value "inventor" displayed by the drop down menu. The client 210 can request that the web server 230 filter the data 252 based on the value "inventor." The web server 230 can return the rows for which the role is "inventor." Then the client 210's browser 212 can display the row for Jackie since in this illustration Jackie is the only inventor.

According to one embodiment, distinct filtering values 262 are received without requiring retrieval of filtering values that are unrelated to the selected type of data. Continuing the example, the selected type of data is "Role" and the filtering values that are unrelated to the selected type of data include the states, such as California, Nevada, and Washington, and the ages, such as 40, 41, and 42.

Web Page

Figure 3:
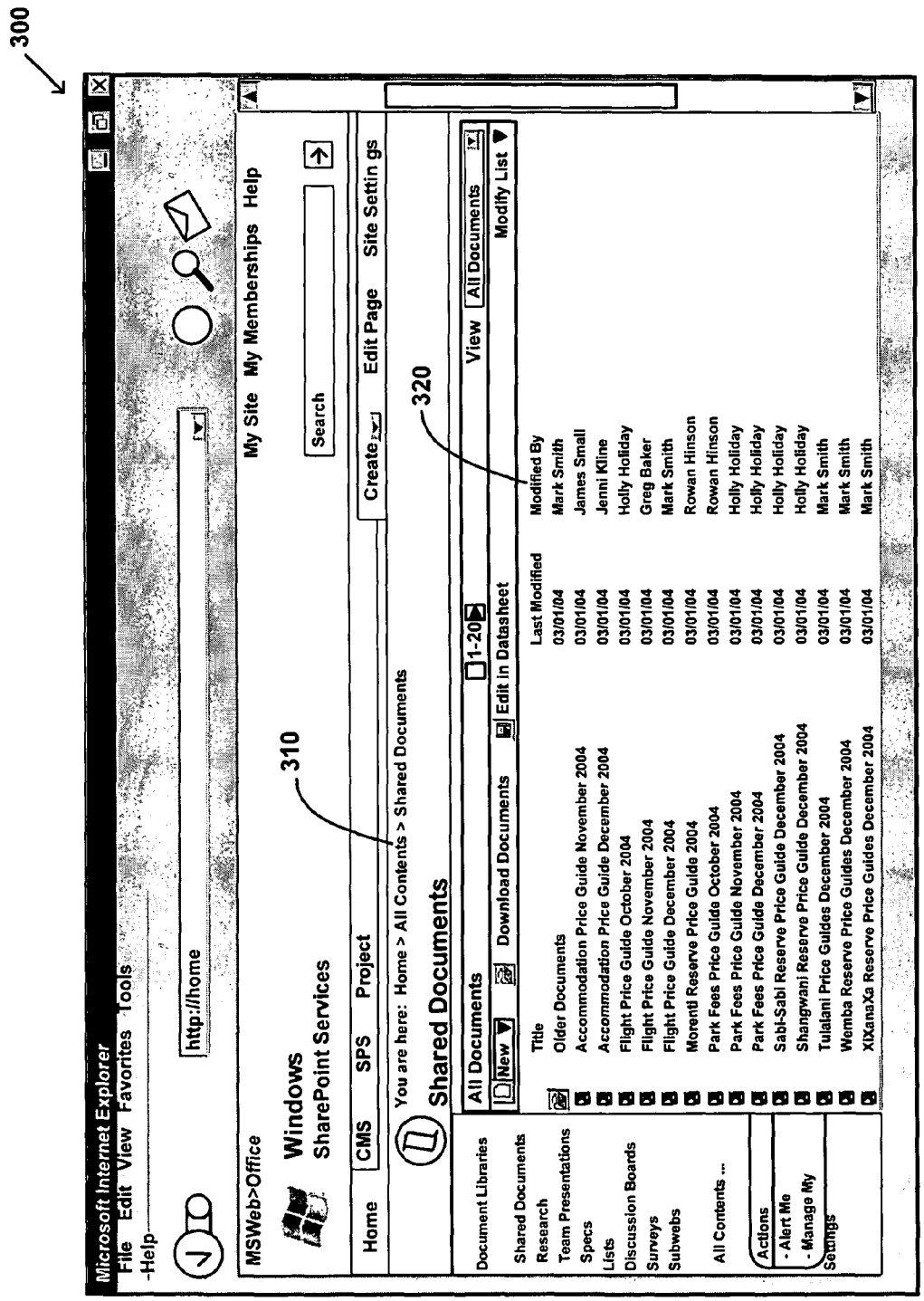
FIG. 3 depicts a web page that can be used for efficiently filtering using a web site, according to one embodiment of the present technology.

FIG. 3 depicts a web page that can be used for efficiently filtering using a web site, according to one embodiment of the present technology. As depicted in FIG. 3, the web page 300 is associated with collaboration software, such as Windows Share Point Services™, and therefore enables filtering data 252 associated with the collaboration software, according to one embodiment. The web page 300, according to the embodiment depicted in FIG. 3, depicts all of the shared documents 310 associated with a project. In the embodiment depicted on FIG. 3 all of the shared documents 310 are examples of data 252.

The browser 212 of the client 210 can be used for displaying the web page 300. According to one embodiment, the web page 300 is an example of a web page 213. By clicking on or moving the mouse over a column header 320 a visual representation that can be used to request distinct filtering values 262 is displayed, according to one embodiment. For the sake of illustration, assume that the user of the client 210 desires to filter on people who have modified data 252 associated with the collaboration software.

According to one embodiment, the web pages depicted in FIGS. 3-10 are examples of web pages 213.

Visual Representation of a Request for Distinct Filtering Values

Figure 4:
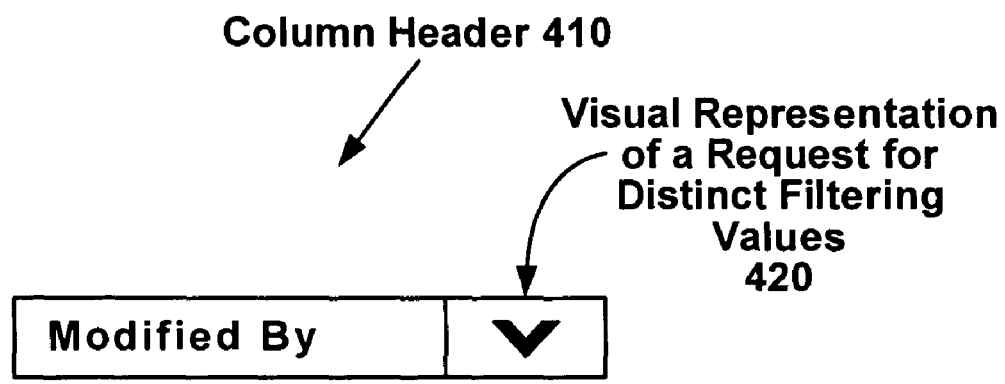
FIG. 4 depicts a block diagram of a "modified by" column header with a visual representation of a request for distinct filtering values, according to one embodiment of the present technology.

FIG. 4 depicts a block diagram of the "modified by" column header 410 with a visual representation of a request for distinct filtering values 420, according to one embodiment of the present technology.

A user may want to perform a filtering operation. Therefore, the user may want to see distinct filtering values 262 for a particular type of data they are interested in. As depicted in FIG. 4, the column header would enable filtering for documents modified by a particular person. In this case, according to one embodiment, "modified by" as depicted in FIG. 4 describes a type of data that a user would be interested in.

Therefore, according to one embodiment, a request for distinct filtering values is visually represented to the user as "a visual representation of a request for distinct filtering values 420." Note, that according to one embodiment, the "modified by" header 320 does not depict a visual representation for requesting distinct filtering values 420. According to one embodiment, the visual representation 420 is displayed on a web page 300 by either clicking on the column header 320 or by moving the mouse over the column header 320.

According to one embodiment, distinct filtering values 262 are displayed as a result of the visual representation 420 being clicked on. For example, when the visual representation 420 is clicked on, the filtering values requester 110 can request the distinct filtering values 262 and the web server 230 can return the distinct filtering values 262. The filtering values displayer 120 can display the distinct filtering values 262, for example as described herein.

According to another embodiment, the filtering values requester 110 can request distinct filtering values 262 prior to a column header 320 being clicked on. For example, distinct filtering values 262 can be requested and displayed on a client 210 as the result of moving the mouse over a column header 320.

Invisible Browser Window

As already stated, an invisible browser window 214 can be used as a part of displaying distinct filtering values 262. For example, after a user clicks on a visual representation 420, the filtering values requester 110 can receive the distinct filtering values 262 from a web server 230. The filtering values displayer 120 can store the distinct filtering values 262 in an invisible browser window 214. According to one embodiment, the invisible browser window 214 is an iFrame. An invisible browser window 214 may also be referred to as a "browser frame."

The filtering values displayer 120 can take the distinct filtering values 262 out of the invisible browser window 214 and then display the distinct filtering values 262 without requiring the entire web page 213 to be redisplayed. For example, the distinct filtering values 262 can be taken out of the invisible browser window 214 and displayed in a drop down menu. Using an invisible browser window 214 enables, among other things, a user's experience to be for the most part uninterrupted, according to one embodiment.

Drop Down Menu

Figure 5:
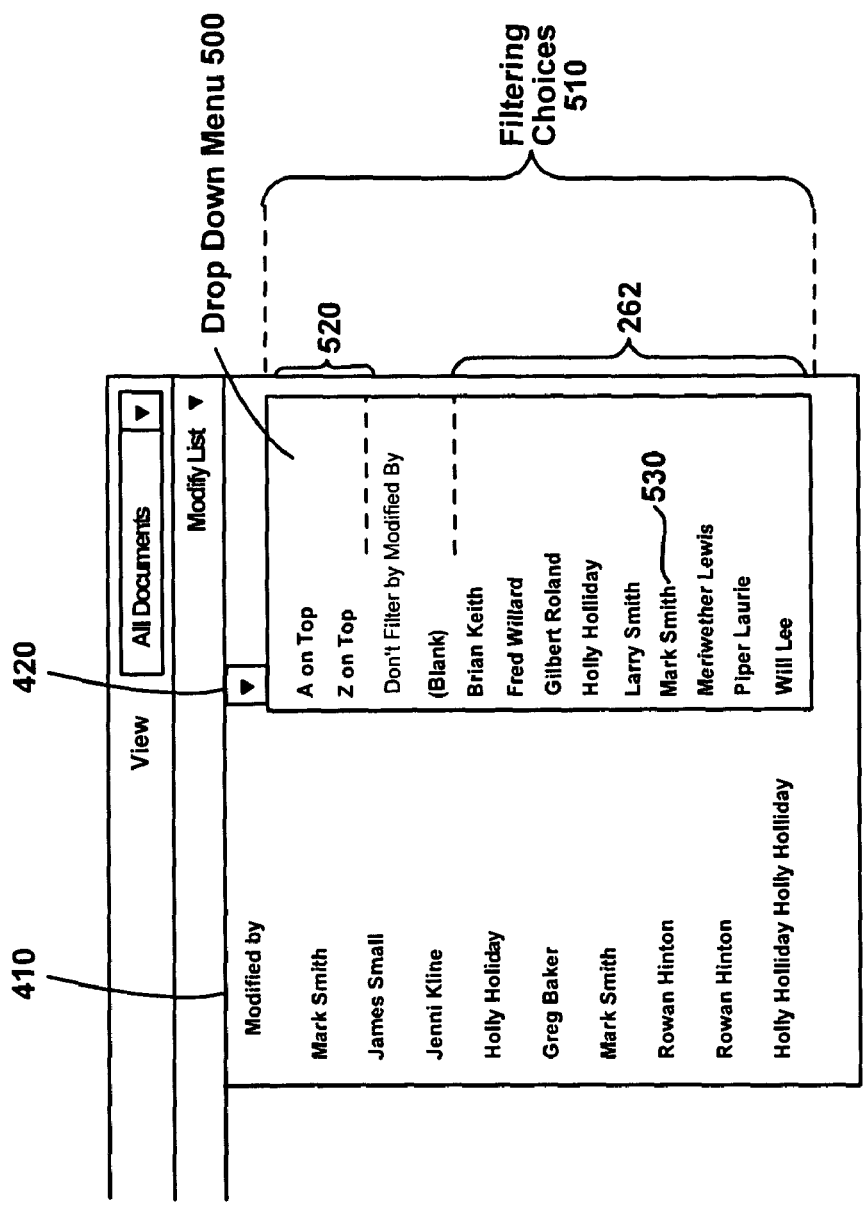
FIG. 5 depicts a drop down menu of displayed filtering choices 510, according to one embodiment of the present technology

The present technology displays a drop down menu that depicts distinct filtering values 262, according to one embodiment. FIG. 5 depicts a drop down menu 500 of displayed filtering choices 510, according to one embodiment of the present technology. According to one embodiment, a drop down menu 500 is a portion of a web page 213. According to one embodiment, sort orders 520 and distinct filtering values 262 are examples of filtering choices 510. The sort orders 520 can be used for sorting the results from performing a filtering operation.

A value 530 can be selected from the distinct filtering values 262 in order to perform a filtering operation using this selected value 530. As depicted in FIG. 5, the selected value 530 is Mark Smith. The value 530 can be selected from the distinct filtering values 262 which results in filtering data 252 using Mark Smith.

Figure 6:
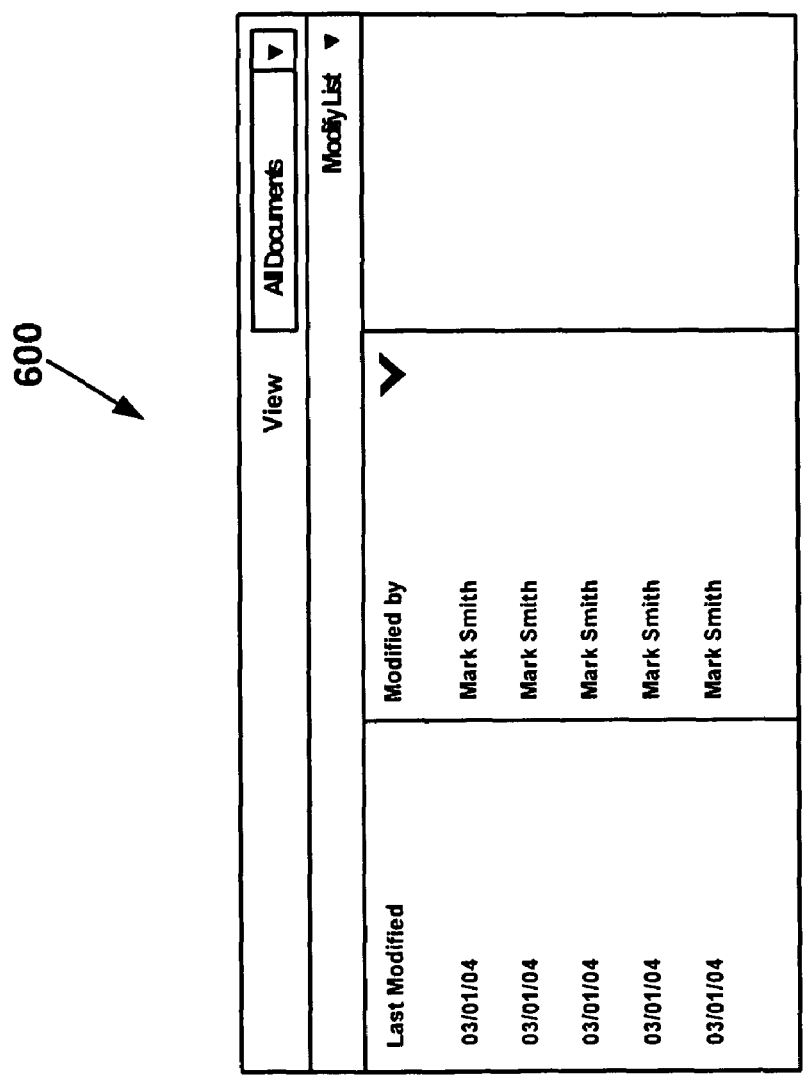
FIG. 6 depicts a web page that displays filtered results, for example, after selecting a distinct filtering value, according to one embodiment of the present technology.

FIG. 6 depicts a web page 600 that displays results from performing a filtering operation using the selected value Mark Smith, according to one embodiment. The results depicted in FIG. 6 are examples of dates that documents were modified by Mark Smith.

As already stated, conventional filtering systems re-update a web page 213 each time a filtering operation is performed due to limitations of HTML and JavaScript. However, according to one embodiment, using a drop down menu allows efficient filtering by eliminating the need to re-update the entire web page 213.

Distinct Filtering Values and Filtering Choices

Figure 7:
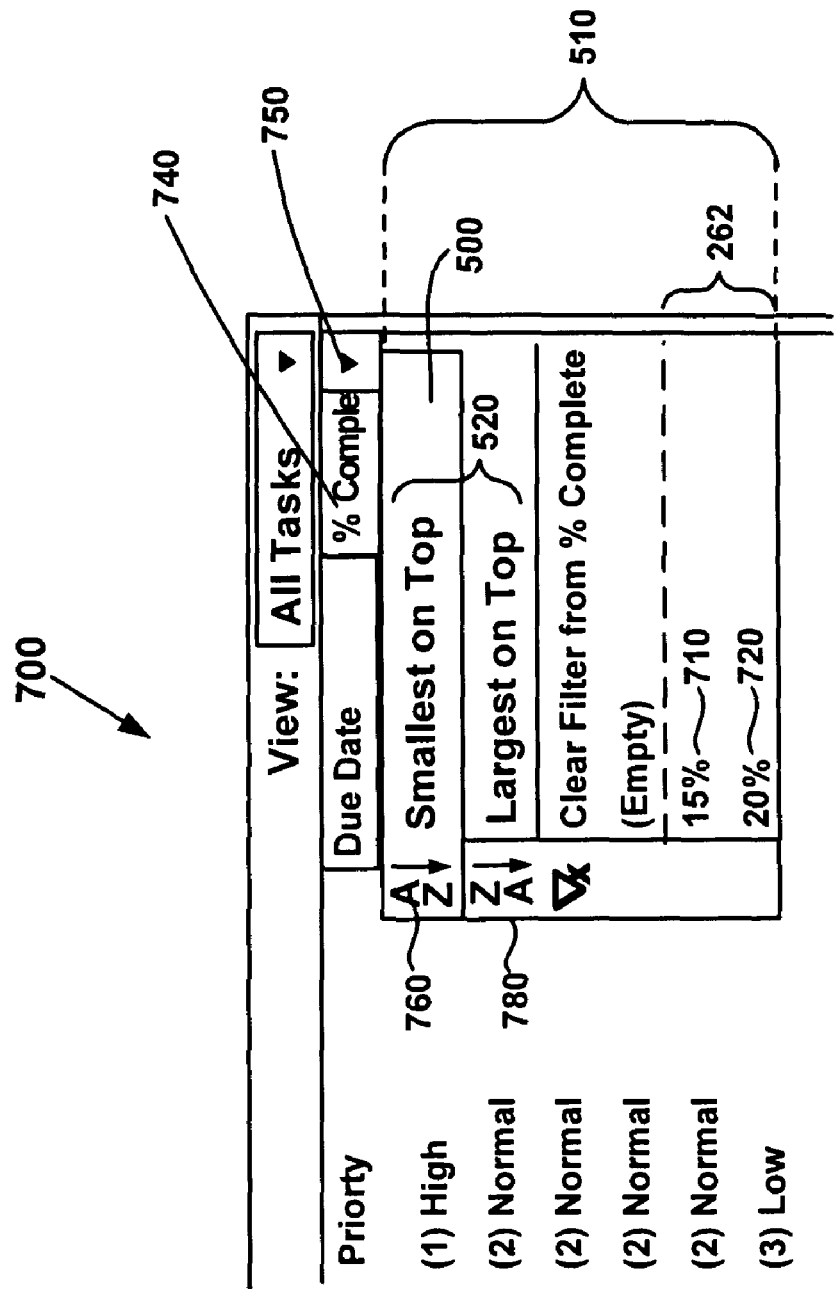
FIG. 7 depicts a web page with a drop down menu displaying filtering choices, according to another embodiment of the present technology.

FIG. 7 depicts a web page 700 with a drop down menu 500 displaying filtering choices 510, according to another embodiment. According to one embodiment, the number of values that result from a filtering operation being performed can be rather large. For example for the purposes of illustration assume that the data 252 (FIG. 2) includes the cities that a company's customers are located in. Further assume that there are a million customer cities. Therefore, according to one embodiment, the distinct filtering values 262 enable that a subset of the million cities be provided to the client 210 (FIG. 2). For example, 25 of the million cities may be provided to the client 210. Customers' cities is an example of a type of data, according to one embodiment.

In another example, a specified percentage, such as 15% or 20%, of the 100,000 cities may be provided to the client 210. For example, as depicted in FIG. 7 two of the distinct filtering values are 15% filtering value 710 and 20% filtering value 720. If the 15% filtering value 710 is selected, then 15% of the million cities can be stored in the invisible browser window 214 which can then be displayed in a drop down menu. If the 20% filtering value 720 is selected, then 20% of the million cities can be stored in the invisible browser window 214 which can then be displayed in the drop down menu.

According to one embodiment, the distinct filtering values 262 represent groups of data 252. Continuing the example of a million cities, the distinct filtering values 262 may represent cities that start with letters A-D, the cities that start with letters E-G, and so on. For example, the distinct filtering values 262 displayed on a drop down menu on the client 210 may have the text "Cities starting with letters A-D," "Cities starting with letters E-G," and so on. If "cities starting with letters E-G" is selected, then the data 252 is filtered for the cities starting with letters E-G, according to one embodiment. The cities starting with letters E-G can be returned to and displayed on the client 210.

According to one embodiment, a portion of the data 252 is divided into groups that the distinct filtering values 262 represent. For example, cities may be a portion of the data 252 which are divided into groups as described herein.

According to one embodiment, the groups are displayed in cascading menus. For example, the group of cities that start with letters A-D may be displayed in one cascading menu and the group of cities that start with letters E-G may be displayed in another cascading menu and so on.

According to one embodiment, the groups of data 252 that the distinct filtering values 262 represent may be determined dynamically. For example, at one point of time there may be only a few cities and then at a later point of time there may be a large number of cities. When there are a small number of cities there may only be two groups such as the cities starting with letters A-M and the cities starting with letters N-Z. When there are a large number of cities there may be a larger number of groups such as the example previously given.

FIG. 8 depicts a web page 800 with a distinct filtering value 810 that has been selected, according to one embodiment. For example as depicted in FIG. 8, the 20% filtering value 810 is checked because a user selected the 20% filtering value 810.

According to one embodiment, a user can type a few letters to jump to a distinct filtering value 262 that starts with those first few letters. For example assume that the distinct filtering values 262 are displayed on a client 210 and the user is interested in finding the city "Milwaukee." The user can type in the letter "M" and the cities that start with "M" will be displayed. In another example, the user can type in "Mil" and the cities that start with "Mil" will be displayed.

According to one embodiment, the speed at which the letters are typed in affects which distinct filtering values 262 are displayed. For example, if the user wants to type in "Mil" but types in each of the letters slowly, the distinct filtering values 262 that start with "M" may be displayed then the distinct filtering values 262 that start with "Mi" may be displayed finally the distinct filtering values 262 that start with "Mil" may be displayed.

Figure 9:
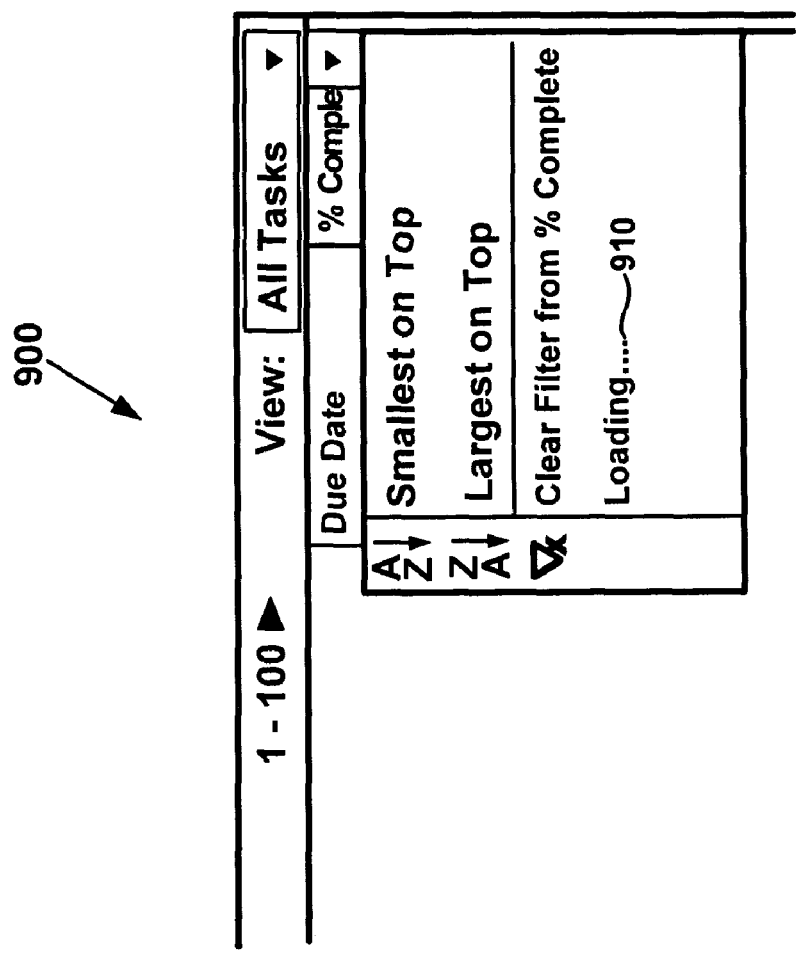
FIG. 9 depicts a web page with a message indicating that distinct filtering values are in the process of being loaded, according to one embodiment of the present technology.

In the event that the client 210 cannot display the distinct filtering values 262 in a relatively short time, FIG. 9 depicts a web page 900 with a message 910 indicating that distinct filtering values 262 are in the process of being displayed on the client 210, according to one embodiment. For example, the message 910 may be displayed when a threshold of time has elapsed. According to one embodiment, an example of a threshold of time is 5 seconds. According to another embodiment, an example of a threshold of time is 3/10 of a second.

Figure 10:
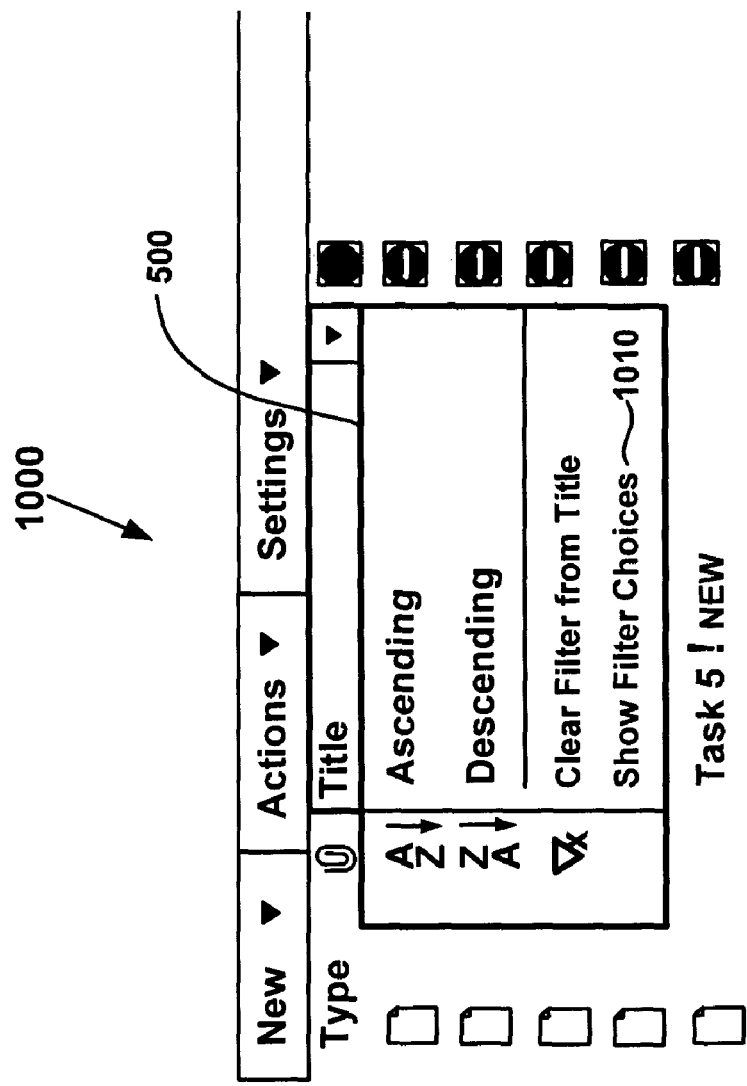
FIG. 10 depicts a web page with a drop down menu, according to yet another embodiment of the present technology.

FIG. 10 depicts a web page 1000 with a drop down menu 500, according to yet another embodiment. The number of distinct filtering values 262 may be too large to efficiently filter 15% or 20% of the data 252. For example, if the number of cities is a million, 15% or 20% of a million may be too large to efficiently provide to a client 210. In this case, the distinct filtering values 262 can include a show filter choices 1010 that enable the user to select, for example, 1% or 2% instead of 15% or 20%.

The distinct filtering values 262 enable a subset of the data 252 to be presented on a client 210, according to one embodiment. For example, a user can select the 20% distinct filtering value 720 resulting in 20% of a type of data 252. More specifically, assume a type of data is the names of people working on a project. Clicking on the 20% 720 in this case would result in 20% of the names being returned to the client 210.

According to one embodiment, the distinct filtering values 262 only include distinct values associated with a type of data. For example, assume that the type of data is "modified by," however one of the people associated with a project hasn't modified any documents. In this case, the distinct filtering values 262 would not include the name of that person, for example.

Sort orders and percentages are two examples of filtering choices. Referring to FIGS. 7-10, examples of visual representations of sort orders are "smallest on top," "largest on top," "ascending," "descending," and visual representations (760 and 780) with the letters "A," "Z," and the arrows. The visual representations (760 and 780) with the letters "A," "Z" and the arrows provide user friendly indications of types of sorts that can be performed for example in conjunction with filtering. For example, visual representation 760 with the A on top of the Z indicates that the results from a sort would start with the letter A and end with the letter Z. Alternatively, visual representation 780 with the letter Z on top of A indicates that the results from a sort would start with the letter Z and end with the letter A.

According to one embodiment, the present technology detects types of values that can be filtered or sorted. The displayed distinct filtering values, according to one embodiment, are user friendly text descriptions that correspond to the types of the values. For example, the terms "ascending" and "descending" mean different things depending on the types of values. Table 1 depicts distinct filtering values 262 that correspond to the conventional terms "ascending" and "descending," according to various embodiments.

TABLE 1 distinct filtering values that correspond to the conventional terms "ascending" and "descending," according to one embodiment.

| Type of Value | Ascending | Descending |
| --- | --- | --- |
| Text | A on top | Z on top |
| Date | Oldest on top | Newest on top |
| Numerical | Smallest on top | Largest on top |
| Attachments | Blanks on top | Attachments on top |

The first column of Table 1 designates the type of the values that can be associated with data 252. The second column of Table 1 designates distinct filtering values that corresponding to the conventional term "Ascending" according to one embodiment. The third column of Table 1 designates distinct filtering values that correspond to the conventional term "Descending," according to another embodiment. For example, if values associated with data 252 are text then the distinct filtering values presented to a user are "A on top" and "Z on top," according to one embodiment, and so on.

Sorting and Filtering

As can be seen, according to one embodiment, methods and systems are provided for sorting and filtering in a user friendly intuitive manner. For example, referring to FIG. 7, a split button 740 is depicted on web page 700, according to one embodiment. A split button 740, according to one embodiment, provides for sorting and for filtering. As depicted in FIG. 7, split button 740 includes the text "% complete" and visual representation of a request for distinct filtering values 750. For example, if a user clicks on the text "% complete", then sorting is performed. If the user clicks on the visual representation 750, then distinct filtering values 262 can be displayed. The visual representation 750 is an example of a visual representation of a request for distinct filtering values 420, according to one embodiment.

According to various embodiments, distinct filtering values 262 can be sorted. For example, distinct filtering values 262 displayed on FIG. 5 are sorted alphabetically. Various embodiments of the present technology can be used for sorting distinct filtering values 262 but also for sorting and filtering data 252. For example, the distinct filtering values 262 depicted in FIG. 5 are an example of distinct filtering values that have been sorted. For an example of using various embodiments to filter and sort data 252, assume that a distinct filtering value "cities starting with letters E-G" is selected. The web server 230 can filter the data 252 based on the distinct filtering value "cities that start with E-G" and then the filtered cities can be sorted. Although these examples of embodiments described filtering being performed before sorting, sorting can be performed before filtering.

Example Computer System Environment

Figure 11:
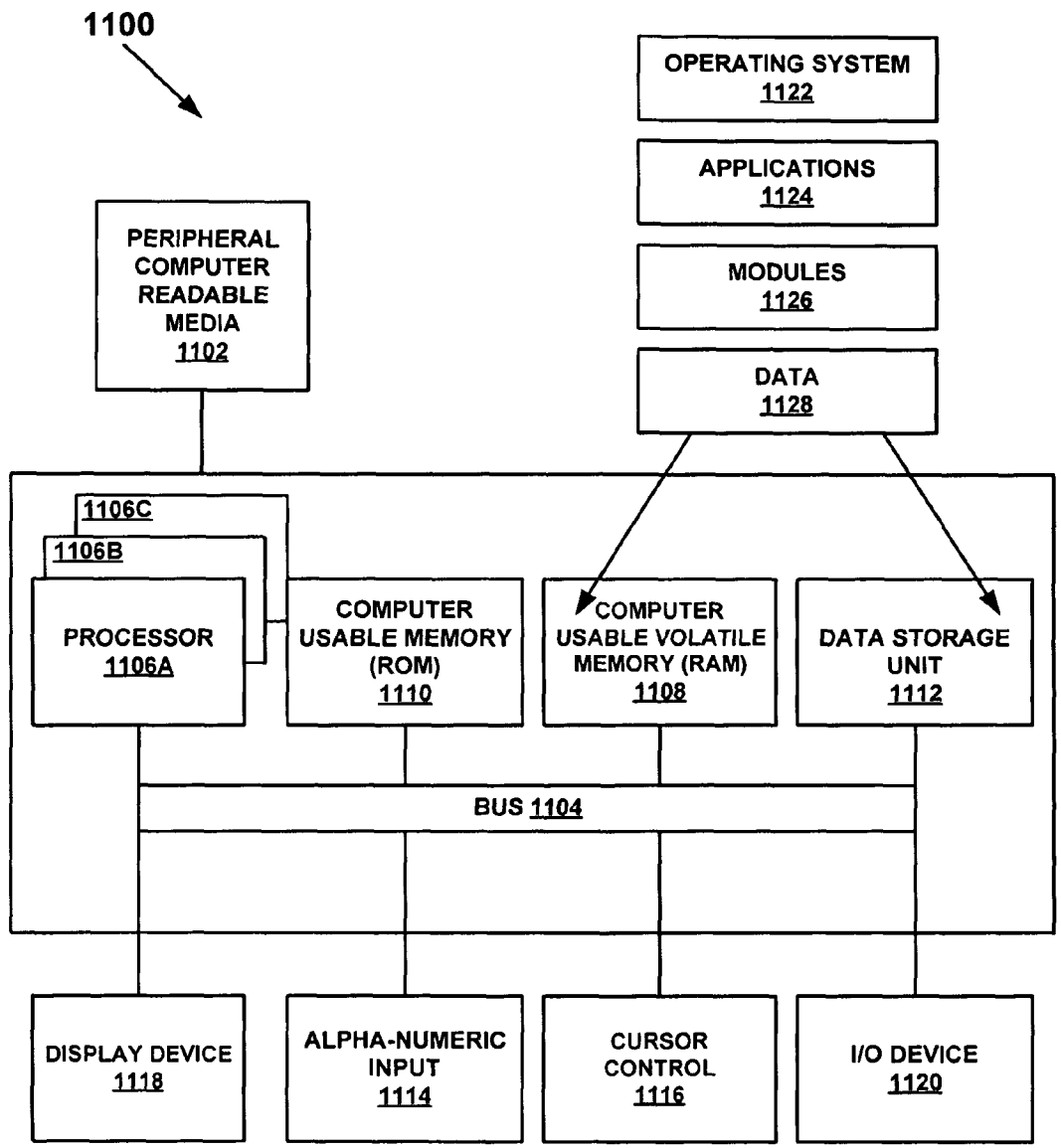
FIG. 11 illustrates one example of a type of computer that can be used to implement embodiments, which are discussed herein, of the present technology for efficiently filtering using a web site

With reference now to FIG. 11, portions of the technology for efficiently filtering using a web site are composed of computer-readable and computer-executable instructions that reside, for example, in computer-usable media of a computer system. That is, FIG. 11 illustrates one example of a type of computer that can be used to implement embodiments, which are discussed herein, of the present technology for efficiently filtering using a web site. FIG. 11 illustrates an exemplary computer system 1100 used in accordance with embodiments of the present technology for efficiently filtering using a web site. It is appreciated that system 1100 of FIG. 11 is exemplary only and that the present technology for efficiently filtering using a web site can operate on or within a number of different computer systems including general purpose networked computer systems, embedded computer systems, routers, switches, server devices, client devices, various intermediate devices/nodes, stand alone computer systems, and the like. As shown in FIG. 11, computer system 1100 of FIG. 11 is well adapted to having peripheral computer readable media 1102 such as, for example, a floppy disk, a compact disc, and the like coupled thereto.

System 1100 of FIG. 11 includes an address/data bus 1104 for communicating information, and a processor 1106A coupled to bus 1104 for processing information and instructions. As depicted in FIG. 11, system 1100 is also well suited to a multi-processor environment in which a plurality of processors 1106A, 1106B, and 1106C are present. Conversely, system 1100 is also well suited to having a single processor such as, for example, processor 1106A. Processors 1106A, 1106B, and 1106C may be any of various types of microprocessors. System 1100 also includes data storage features such as a computer usable volatile memory 1108, e.g. random access memory (RAM), coupled to bus 1104 for storing information and instructions for processors 1106A, 1106B, and 1106C. System 1100 also includes computer usable non-volatile memory 1110, e.g. read only memory (ROM), coupled to bus 1104 for storing static information and instructions for processors 1106A, 1106B, and 1106C. Also present in system 1100 is a data storage unit 1112 (e.g., a magnetic or optical disk and disk drive) coupled to bus 1104 for storing information and instructions. System 1100 also includes an optional alphanumeric input device 1114 including alphanumeric and function keys coupled to bus 1104 for communicating information and command selections to processor 1106A or processors 1106A, 1106B, and 1106C. System 1100 also includes an optional cursor control device 1116 coupled to bus 1104 for communicating user input information and command selections to processor 1106A or processors 1106A, 1106B, and 1106C. System 1100 of the present embodiment also includes an optional display device 1118 coupled to bus 1104 for displaying information.

Referring still to FIG. 11, optional display device 1118 of FIG. 11 may be a liquid crystal device, cathode ray tube, plasma display device or other display device suitable for creating graphic images and alphanumeric characters recognizable to a user. Optional cursor control device 1116 allows the computer user to dynamically signal the movement of a visible symbol (cursor) on a display screen of display device 1118. Many implementations of cursor control device 1116 are known in the art including a trackball, mouse, touch pad, joystick or special keys on alpha-numeric input device 1114 capable of signaling movement of a given direction or manner of displacement. Alternatively, it will be appreciated that a cursor can be directed and/or activated via input from alphanumeric input device 1114 using special keys and key sequence commands. System 1100 is also well suited to having a cursor directed by other means such as, for example, voice commands. System 1100 also includes an I/O device 1120 for coupling system 1100 with external entities. For example, in one embodiment, I/O device 1120 is a modem for enabling wired or wireless communications between system 1100 and an external network such as, but not limited to, the Internet.

Referring still to FIG. 11, various other components are depicted for system 1100. Specifically, when present, an operating system 1122, applications 1124, modules 1126, and data 1128 are shown as typically residing in one or some combination of computer usable volatile memory 1108, e.g. random access memory (RAM), and data storage unit 1112. In one embodiment, the present technology for efficiently filtering using a web site, for example, is stored as an application 1124 or module 1126 in memory locations within RAM 1108 and memory areas within data storage unit 1112.

Exemplary Method of Efficiently Filtering Using a Web Site

Figure 12:
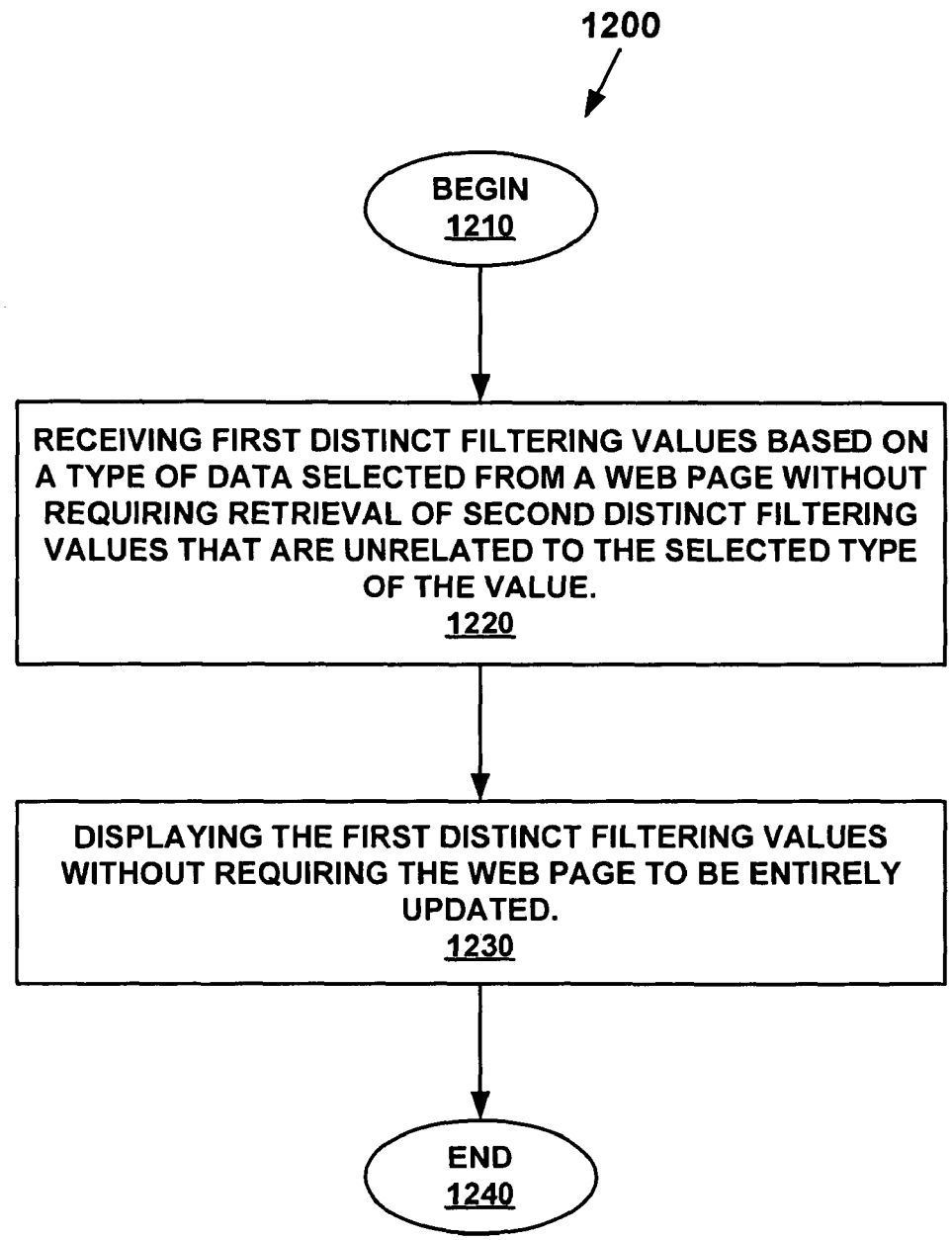
FIG. 12 depicts a flowchart for a method of efficiently filtering using a web site, according to one embodiment of the present technology.

FIG. 12 depicts a flowchart for a method of efficiently filtering using a web site, according to one embodiment of the present technology. Although specific steps are disclosed in flowchart 1200, such steps are exemplary. That is, various embodiments of the present technology are well suited to performing various other steps or variations of the steps recited in flowchart 1200. It is appreciated that the steps in flowchart 1200 may be performed in an order different than presented, and that not all of the steps in flowchart 1200 may be performed.

The computer-readable and computer-executable instructions reside, for example, in data storage features such as computer usable volatile memory 1108, computer usable non-volatile memory 1110, and/or data storage unit 1112 of FIG. 11. The computer-readable and computer-executable instructions are used to control or operate in conjunction with, for example, processor 1106A and/or processors 1106A, 1106B, and 1106C of FIG. 111. Although specific steps are disclosed in flowchart 12, such steps are exemplary. That is, embodiments are well suited to performing various other steps or variations of the steps recited in flowchart 12. It is appreciated that the steps in flowchart 12 may be performed in an order different than presented, and that not all of the steps in flowchart 12 may be performed.

In step 1210, the method begins.

In step 1220, distinct filtering values based on a type of data selected from a web page are received. For example, assume for the purposes of illustration that data 252 is associated with collaboration software and includes documents, e-mails, calendars, and a list of people that work on a project. A web page 213 displays the data 252 on a client 210. Web page 300 (FIG. 3) is an example of a web page 213 for displaying data 252 associated with collaboration software.

A user interacts with the client 210 which causes the client 210 to request that a web server 230 provide distinct filtering values 262 from memory 250 to the client 210. For example, the user may be interested in obtaining all of the documents that have been modified by Mark Smith. The user can cause the client 210 to request distinct filtering values 262 by moving a mouse over a column header 320 (FIG. 3) displayed on their client 210. Alternatively, the user cause the client 210 to request distinct filtering values 262 by clicking on the column header 320 resulting in a visual representation of a request for distinct filtering values 420 being displayed and then clicking on the visual representation 420 to cause the distinct filtering values 262 to be retrieved.

The filtering values requestor 110 can request that the web server 230 transmit the distinct filtering values 262 to the client 210. For the purposes of illustration, assume that the distinct filtering values 262 are the names of people who have modified documents associated with data 252.

In this illustration, "modified by" is an example of a type of data. In this illustration, distinct filtering values associated with calendars and e-mails are examples of distinct filtering values that are unrelated to the selected type of data. For example, a column of a web page 213 may be for the subject line of e-mails and the distinct filtering values that would result from clicking on that column may be all of the subject lines of e-mails for a project. The subject lines for the e-mails do not need to be retrieved in order to retrieve the names of people who have modified documents.

In step 1230, the distinct filtering values are displayed without requiring the web page to be entirely updated. For example, the client 210 can receive the distinct filtering values 262. The filtering values displayer 120 can store the received filtering values 262 in an invisible browser window 214. The distinct filtering values 262 can be taken out of the invisible browser window 214 and put into a drop down menu 500 as depicted in FIG. 5. By using a drop down menu 500, the entire web page 213 will not have to be redrawn. The use of a drop down menu 500 is one example of a way of not requiring the entire web page 213 to be redrawn.

In step 1240, the method stops.

Assume for the sake of illustration, that the user clicks on the distinct filtering value 530 for Mark Smith depicted on FIG. 5. The client 210 will request that the web server 230 filter the data 252 for the rows associated with documents that were last modified by Mark Smith, according to one embodiment. The web server 230 can return the rows associated with documents that were last modified by Mark Smith to the client 210. The client can display the results of the filtering operation as depicted in FIG. 6.

CONCLUSION

Although many of the embodiments described herein referred to distinct filtering values 262, various embodiments of the present technology can be used with filtering choices 510. For example, referring to FIG. 7 the filtering choices include the sort orders "smallest on top" and "largest on top." A web server 230 can determine the filtering choices depicted in FIG. 7 for example by determining the different types of the values in the data 252. For example, referring to Table 1 if one type of the values in data 252 is numerical then filtering choices can include "smallest on top" and "largest on top."

Further the web server 230 can determine whether the results from a potential filtering operation would be large. The filtering choices also include percentages, such as 15% and 20%, according to one embodiment. In this case, the web server 230 can determine that the distinct filtering values 262 could include 15% and 20%, according to one embodiment.

Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of efficiently filtering using a web site, the method comprising:
  receiving first distinct filtering values from the web site based on a type of data selected from a web page associated with the web site, without requiring retrieval of second distinct filtering values that are unrelated to the selected type of the data, wherein the first distinct filtering values are values from the data;
  storing the first distinct filtering values in an invisible browser window;
  sorting the first distinct filtering values; and
  displaying the first distinct filtering values in a drop down menu in the web page, without requiring the web page to be entirely updated.

2. The method as recited in claim 1, further comprising:
  dividing at least a portion of the data into groups; and
  using the first distinct filtering values to represent the groups.

3. The method as recited in claim 1, further comprising:
  receiving the first distinct filtering values prior to the first distinct filtering values being requested.

4. The method as recited in claim 3, further comprising:
  detecting that a mouse is moving over a visual representation of the type of the data; and
  requesting the first distinct filtering values based on the type of the data depicted by the visual representation of the type of the data.

5. A system for efficiently filtering using a web page, the system comprising:
  a processor;
  a filtering values requestor for execution by the processor to request first distinct filtering values from a web site based on a user selected type of data from the web page associated with the web site, without requesting second distinct filtering values that are unrelated to the user selected type of the data, wherein the first distinct filtering values are values from the data;
  a filtering values displayer coupled to the filtering values requestor, the filtering values displayer for execution by the processor and to store the first distinct filtering values in an invisible browser window, sort the first distinct filtering values, and display the first distinct filtering values in a drop down menu in the web page, whereby the web page is not entirely updated.

6. The system of claim 5, wherein the system is associated with collaboration software.

7. The system of claim 5, wherein the type of the data is represented by a column header associated with the web page.

8. The system of claim 5, wherein a filtering operation is performed on the data as a result of one of the first distinct filtering values being selected.

9. The system of claim 5, wherein one of the first distinct filtering values represents a percentage of the type of the data.

10. The system of claim 5, wherein the first distinct filtering values represent a subset of the data.

11. The system of claim 5, further comprising a split button that is displayed on the web page, wherein the split button enables a user to select an operation selected from a group consisting of sorting and filtering.

12. Instructions on a computer-usable medium wherein the instructions when executed cause a computer system to perform a method of efficiently filtering using a web site, the method comprising:
    receiving first filtering choices from the web site based on a type of data selected from a web page associated with the web site, without requiring retrieval of second filtering choices that are unrelated to the selected type of the data, wherein the first filtering choices are values from the data;
    storing the first filtering choices in an invisible browser window;
    sorting the first filtering choices; and
    displaying the first filtering choices in a drop down menu in the web page, without requiring the web page to be entirely updated.

13. The instructions of claim 12 wherein the instructions which when executed cause the computer system to receive the first filtering choices further comprise instructions for:
    receiving distinct filtering values that are a subset of the first filtering choices.

14. The instructions of claim 12 wherein the instructions which when executed cause the computer system to receive the first filtering choices further comprise instructions for:
    receiving an order for sorting the data.

15. The instructions of claim 14, wherein the instructions which when executed cause the computer system to receive the order for sorting further comprise instructions for:
    receiving text descriptions of ascending and descending that correspond to the selected type of the data.

16. A computer-implemented method of efficiently filtering using a web site, the method comprising:
    receiving first distinct filtering values from the web site based on a type of data selected from a web page associated with the web site, without requiring retrieval of second distinct filtering values that are unrelated to the selected type of the data, wherein the first distinct filtering values are values from the data;
    receiving an order for sorting the data and text descriptions of ascending and descending that correspond to the selected type of the data;
    storing the first distinct filtering values in an invisible browser window;
    sorting the first distinct filtering values; and
    displaying the first distinct filtering values in a drop down menu in the web page, without requiring the web page to be entirely updated.

* * * * *